United States Patent [19]

Bakken

[11] Patent Number: 4,704,422
[45] Date of Patent: Nov. 3, 1987

[54] SILICONE EMULSION HAVING IMPROVED FREEZE/THAW RESISTANCE

[75] Inventor: Kathy L. Bakken, Stoughton, Wis.

[73] Assignee: Dow Corning Corporation, Midland, Mich.

[21] Appl. No.: 902,719

[22] Filed: Sep. 2, 1986

[51] Int. Cl.$^4$ .................................................. C08K 5/06
[52] U.S. Cl. ...................................... 524/375; 524/376; 524/762; 524/860; 528/18; 528/34
[58] Field of Search ............... 524/375, 376, 762, 860; 528/18, 34

[56] References Cited

U.S. PATENT DOCUMENTS 3,706,695 12/1972 Huebner et al. .................. 117/226
4,124,523 11/1978 Johnson ............................ 252/145
4,618,642 10/1986 Schoenherr ....................... 524/425

*Primary Examiner*—Melvyn I. Marquis
*Attorney, Agent, or Firm*—Edward C. Elliott

[57] ABSTRACT

A method of improving the freeze/thaw stability of an anionically stabilized silicone emulsion useful as a sealant, has been developed. The method comprises the use of nonoxynol-10 in combination with ethylene glycol added to an emulsion comprising 100 parts by weight of an anionically stabilized, hydroxyl endblocked polydiorganosiloxane present as an emulsion of dispersed particles in water, from 0.075 to 0.75 part of weight of dialkyltindicarboxylate, from 0.2 to 5 parts by weight of silane of the formula $RSi(OR')_3$, and from 50 to 200 parts by weight of inert, non-siliceous filler.

8 Claims, No Drawings

SILICONE EMULSION HAVING IMPROVED FREEZE/THAW RESISTANCE

BACKGROUND OF THE INVENTION

1. Field of the Invention

This invention relates to silicone emulsions useful as sealants which cure to an elastomer upon removal of water.

2. Background Information

Silicone emulsions which are useful as sealants that cure to elastomers upon the removal of water are described in U.S. application Ser. No. 729,835, filed May 2, 1985, now U.S. Pat. No. 4,618,642. Further experience with such emulsions, which are used as caulking materials, has shown that their resistance to freeze/thaw cycles diminishes as the material shelf ages.

U.S. Pat. No. 3,706,695, issued Dec. 19, 1972, to Huebner, teaches a method of preparing a silicone emulsion. A nonionic emulsifier is used during the process to keep the dispersion in an emulsified state during the remainder of the process.

U.S. Pat. No. 4,124,523, issued Nov. 7, 1978, teaches that a silicone-containing acidic cleaner and conditioner can be made with a nonionic surfactant used to flocculate colloidal silica.

It is known in the art that nonionic surfactants can be used in the preparation of emulsions of silicone fluids.

SUMMARY OF THE INVENTION

The freeze/thaw resistance of a silicone caulking material based upon a silicone emulsion comprising an anionically stabilized, hydroxyl endblocked polydiorganosiloxane, dialkyltindicarboxylate, trifunctional silane, and inert, non-siliceous filler is improved by the addition of nonoxynol-10.

DESCRIPTION OF THE INVENTION

This invention relates to a method of improving the freeze/thaw stability of an anionically stabilized silicone emulsion useful as a sealant comprising mixing (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical and 2-(perfluoroalkyl)ethyl radicals having less than 7 carbon atoms per radical, present as an emulsion of dispersed particles in water, the emulsion having a pH of greater than 9 and a solids content of greater than 50 percent by weight, (B) from 0.075 to 0.75 part by weight of dialkyltindicarboxylate, (C) from 0.2 to 5 parts by weight of silane of the formulas $RSi(OR')_3$ where R is a monovalent hydrocarbon radical of from 1 to 4 carbon atoms inclusive and R' is a lower alkyl radical of from 1 to 4 carbon atoms inclusive or a radical of the formula $-N=CR_2$ where R is defined as above, (D) from 50 to 200 parts by weight of inert, non-siliceous filler, (E) greater than 1 part by weight of nonoxynol-10, and (F) from 0.5 to 6.0 parts by weight of ethylene glycol, to give a composition having improved freeze/thaw stability.

Silicone emulsions useful as sealants and caulking materials have been produced by the addition of fillers and other additives to emulsions of anionically stabilized polydiorganosiloxane that have been compounded so that they cure to an elastomer upon the removal of water. One of the preferred attributes of such a composition is the ability of the emulsion to resist freeze/thaw cycling. If the emulsion does not have this property, it is destroyed if the emulsion is allowed to freeze. Because it is very difficult to transport and store commercial materials throughout the country without exposing them to freezing conditions, it is a requirement that such commercial products be able to resist at least a number of freeze/thaw cycles. Many of the known silicone emulsions useful as sealants have the ability to resist freeze/thaw cycling when they are first manufactured, but lose this ability upon storage. Improving this defect was the purpose of this invention. As the composition of this invention ages, it still suffers a loss in the number of freeze/thaw cycles before damage to the emulsion is detected, but the number of cycles before this point is reached is raised to a point where there is little chance of damage in commercial situations.

An investigation of many additives found that ingredient (E), nonoxynol-10, a nonionic surfactant of the formula

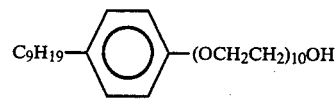

was unique in its ability to improve the number of freeze/thaw cycles an emulsion could be exposed to before the emulsion would fail. As little as 0.5 part by weight of this material added per 100 parts by weight of the polymer in the emulsion would show an improvement. The improvement got even better as the amount of nonoxynol-10 was increased up to 3 parts by weight. No higher amounts were tested since this gave freeze/thaw resistance that was more than that required.

Nonoxynol-10 is a commercial product available under the designation Makon 10 from Stephan Chemicals. It has the formula shown above.

Also required is ingredient (F), ethylene glycol. The ethylene glycol also aids in giving freeze/thaw stability. The freeze/thaw stability is improved as more ethylene glycol is used. With no nonoxynol-10, however, the ethylene glycol does not give sufficient freeze/thaw stability. The amount of ethylene glycol used is from 0.5 to 6.0 parts by weight, with a preferred range of from 1 to 3 parts by weight.

An anionically stabilized silicone emulsion useful in this invention is described in (DC2650) U.S. application Ser. No. 729,835, filed May 2, 1985. This reference is hereby incorporated by reference to show the silicone emulsion and its method of manufacture.

The anionically stabilized, hydroxyl endblocked polydiorganosiloxane used in this invention is now well known in the art. The hydroxyl endblocked polydiorganosiloxane (A) is one which can be emulsified, which imparts elastomeric properties to the product obtained after the removal of the water from the emulsion, and which is anionically stabilized. Tensile strengths and elongations at break improve with increasing weight average molecular weight (Mw), with suitable tensile strengths and elongations obtained above 50,000 Mw. The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred Mw for the hydroxyl endblocked polydiorganosiloxanes are in the range of 200,000 to 700,000.

The organic radicals of the hydroxyl endblocked polydiorganosiloxane can be monovalent hydrocarbon radicals containing less than seven carbon atoms per radical and 2-(perfluoroalkyl)ethyl radicals including 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom but may include trace amounts of monoorganosiloxane or triorganosiloxy units present as impurities of the manufacturing process. The preferred hydroxyl endblocked polydiorganosiloxanes are the hydroxyl endblocked polydimethylsiloxanes.

The preferred anionically stabilized, hydroxyl endblocked polydiorganosiloxanes are those prepared by the method of anionic emulsion polymerization described by Findlay et al. in U.S. Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued June 23, 1959, which is hereby incorporated by reference to show the hydroxyl endblocked polydiorganosiloxanes, the ingredients used, and their method of preparation. These methods and others are known in the art. The hydroxyl endblocked polydiorganosiloxanes used in this invention are those which are anionically stabilized. For the purpose of this invention "anionically stabilized" means the hydroxyl endblocked polydiorganosiloxane is stabilized in emulsion with an anionic surfactant. This silicone emulsion is in the form of an oil-in-water emulsion, i.e., the polydiorganosiloxane is a dispersed phase of particles in a continuous phase of water.

Ingredient (B) is dialkyltindicarboxylate. The dialkyltindicarboxylates are commercial materials. Preferred dialkyltindicarboxylates include dibutyltindiacetate, dibutyltindilaurate, and dioctyltindilaurate with dioctyltindilaurate most preferred. The dialkyltindicarboxylate can be used as is or it can be made into an emulsion. A suitable emulsion is produced by emulsifying 50 percent by weight of the dialkyltindicarboxylate with water using about 10 percent by weight of sodium alkylarylpolyether sulfonate as the emulsifying agent in any of the well known methods of producing oil-in-water emulsions.

Ingredient (C) is a silane of the formula RSi(OR')$_3$ where R is a monovalent hydrocarbon radical of from 1 to 4 carbon atoms inclusive and R' is a lower alkyl radical of from 1 to 4 carbon atoms inclusive or a radical of the formula —N=CR$_2$ where R is as defined above. R can be a saturated hydrocarbon radical, such as methyl, ethyl, propyl, or butyl; or an unsaturated hydrocarbon radical such as vinyl. Preferred R radicals are methyl and vinyl. R' is methyl, ethyl, propyl, butyl, or a radical of the formula —N=CR$_2$ where R is as defined above. Preferred silanes are methyltrimethoxysilane, vinyltrimethoxysilane, and methyltri(ethylmethyloxime)silane.

Ingredient (D) is an inert, non-siliceous filler. The filler is non-siliceous because the combination of ingredients (A) and (B) with a siliceous filler in an emulsion at a pH of greater than 9 will produce a reaction which appears to gradually crosslink the polymer, i.e., the modulus of the elastomer produced by drying the emulsion will gradually increase as the emulsion is aged. This is the effect which is greatly diminished by composition of this invention. Inert fillers suitable for use in anionic silicone emulsions are well known. The fillers have an average particle size below 10 micrometers, preferably below 2 micrometers. Examples of fillers include carbon blacks, titanium dioxide, aluminum oxide, calcium carbonate, zinc oxide, mica, and various pigments. Titanium oxide has been found to be particularly useful as an ultraviolet light screening agent. Calcium carbonate is a preferred filler for the caulking materials of this invention, particularly when it has average particle size of less than 1 micrometer.

Ingredient (E) has been discussed above.
Ingredient (F) has been discussed above.

The composition of this invention is based upon 100 parts by weight of polydiorganosiloxane in the emulsion of (A). From 0.075 to 0.75 part by weight of dialkyltindicarboxylate (B) is used to catalyze the cure of the composition. From 0.2 to 0.4 part by weight of the dialkyltindicarboxylate is preferred. The amount of silane (C) can be varied from 0.2 to 5 parts by weight with a preferred range of from 0.4 to 2 parts by weight.

The amount of filler can vary from 50 to 200 parts by weight. The amount used is determined by the solids content of the emulsion of (A) and the nature of the filler or mixture of fillers chosen. Sufficient filler is used so that the final composition is of the required paste-type viscosity and has the characteristics described above which allow its use as a caulking material. If too little filler is used, the composition will not have a high enough viscosity. If too much filler is used, the material will be too stiff to extrude properly from the storage container, or the cured composition will be too brittle. If the ratio of filler to polydiorganosiloxane is too high, the cured product will not be elastomeric. Preferred are amounts of from 100 to 175 parts by weight. Because these characteristics of the composition depend upon what type of filler or filler mixture is chosen and the particle size of the filler, it is necessary to perform a simple set of experiments using the ingredients chosen to determine the preferred amount of filler. It has been determined that when the emulsion of (A) contains about 60 percent by weight of polydimethylsiloxane, having a weight average molecular weight of about 225,000, the preferred amount of calcium carbonate filler, having an average particle diameter of about 0.7 micrometers, is in the range of from 150 to 165 parts by weight per 100 parts by weight of polydimethylsiloxane. When the emulsion of (A) contains about 70 percent by weight of polydimethylsiloxane, having a weight average molecular weight of about 225,000, the preferred amount of the same filler is in the range of from 90 to 125 parts by weight per 100 parts by weight of polydimethylsiloxane.

The silicone compositions of this invention are prepared by ordinary high intensity mixing of the ingredients until a uniform material is obtained. Preferably, the emulsion of (A) is placed in the mixer, ingredients (B), (C), (E) and (F) are added and mixed, then the filler (D) is slowly added with mixing so that it is uniformly dispersed. The order of addition of the ingredients does not appear to be critical. Because the final mixture is of a paste-type viscosity, the equipment must be strong enough to properly mix the ingredients at this viscosity. In the laboratory, a stainless steel container is used with a propeller-type, air-driven mixer. It is not desirable to build up heat during the mixing process. If necessary, the emulsion can be cooled before the filler is mixed in. After a uniform paste is obtained, the mixture is placed under vacuum or centrifuged to remove air entrapped during the mixing process. The deaired mixture is then placed into a sealed storage container.

Additional ingredients which can be added to the composition include such things as antifoams to aid during the mixing process, stabilizers such as organic amines, preferably 2-amino-2-methyl-1-propanol, and pigments such as titanium dioxide and carbon black to provide opaqueness or color to the cured caulking material.

The silicone composition of this invention is particularly useful as a caulking material. It can be easily extruded from a storage tube into place. Because it is an aqueous emulsion, it is easily tooled if necessary. Tools can be cleaned by washing with water. During cure of the emulsion, primarily water is given off so that there is no problem with odor. Because of the addition of the nonoxynol-10 of this invention, the emulsion can withstand repeated freezing and thawing during storage without destruction of the emulsion.

The following examples are included for illustrative purposes only and should not be construed as limiting the invention which is properly set forth in the appended claims. All parts are by weight.

EXAMPLE 1

A series of silicone emulsions useful as caulking materials were prepared using different amounts of the nonionic surfactants nonoxynol-10 (falling under this invention) and nonoxynol-12 (falling outside of this invention) as additives to investigate their effect upon the freeze/thaw stability of the emulsion.

An emulsion was prepared by mixing in a container with an air driven propeller, 147 parts of an anionically emulsified polydimethylsiloxane emulsion having a solids content of about 70 percent by weight and a pH of about 10, the emulsion particles being less than 0.6 micrometers in average diameter and the polymer having a molecular weight average of greater than 240,000, 0.45 part of vinyltrimethoxysilane, the parts of nonoxynol-10 or nonoxynol-12 shown in Table I, 0.3 part of silicone antifoam having a solids content of about 25 percent by weight and a pH of about 3.5, 1.0 part of ethylene glycol, 0.3 part of polyacrylic acid filler dispersing agent, 0.3 part of hydrolyzed 2-methyl-3(2-aminoethylamino)propyl(methyl)dimethoxysilane, 4 part of titanium dioxide pigment, 2.5 part of 2-amino-2-methyl-1-propanol, 0.5 part of 50 percent solids by weight emulsion of dioctyltindilaurate, and 110 parts of ultrafine calcium carbonate filler.

Each sealant was then placed in a storage tube for test. For the test, the tubes were frozen for 16 hours at −19° C., followed by 8 hours at room temperature to make one freeze/thaw cycle. A one inch bead of the sealant is then extruded from the tube and observed. Failure constitutes any change in appearance of the sealant emulsion.

TABLE I

| Parts | Freeze/Thaw cycles before failure | |
|---|---|---|
| | Invention Nonoxynol-10 | Comparison Nonoxynol-12 |
| 0.5 | 4 | 3 |
| 1.0 | 9 | 5 |
| 1.5 | 15 | 8 |
| 2.0 | 23 | 16 |
| 2.5 | 37 | 19 |
| 3.0 | 50 | 28 |

A similar composition without any nonionic surfactant and 4 parts of the 2-amino-2-methyl-1-propanol failed after 4 cycles initially and after 1 cycle after being aged for 2 weeks at room temperature.

EXAMPLE 2

A series of compositions were prepared, varying the amount of nonoxynol-10 and ethylene glycol used to determine the effect upon freeze/thaw stability. Each composition was similar to that of Example one, except the amounts of nonoxynol-10 and ethylene glycol were varied as shown in Table II, and the composition also contained 0.4 part of a methylcellulose thickener. Each sealant was then tested for freeze/thaw stability with the results shown in Table II.

TABLE II

| Nonoxynol-10 parts | Ethylene Glycol parts | Freeze/Thaw Cycles Before Failure |
|---|---|---|
| 2.2 | 1.0 | 33 |
| 2.5 | 2.0 | 64 |
| 2.8 | 1.0 | 44 |
| 2.5 | 2.0 | 77 |
| 2.5 | 2.0 | 74 |
| 2.8 | 3.0 | 107 |
| 2.2 | 3.0 | 107 |
| 0.0* | 1.0 | 4 |

*no methocel, 4 parts of 2-amino-2-methyl-1-propanol

COMPARATIVE EXAMPLE 1

A similar composition was prepared as in Example 1 except 2.0 parts of the 2-amino-2-methyl-1-propanol was used with 2.5 parts of a nonionic surfactant (Triton X-405) of the

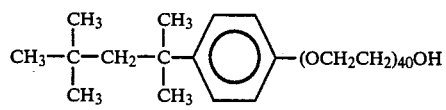

used in place of the nonoxynol-10.

This material failed after 10 freeze/thaw cycles.

COMPARATIVE EXAMPLE 2

When evaluated in a composition similar to that of Example 1, but having 1.0 part of ethylene glycol and 4.0 part of 2-amino-2-methyl-1-propanol, the nonionic surfactants shown in Table 2, used at 0.75 part in place of the nonoxynol-10, failed as shown in Table III.

TABLE III

| Additive | Freeze/Thaw cycles before failure |
|---|---|
| Polyethylene glycol 400 dilaurate | 5 |
| Fatty acid ester of polyethylene glycol | 5 |

COMPARATIVE EXAMPLE 3

When used in a composition similar to that of Example 1, a freeze/thaw stabilizer of the formula

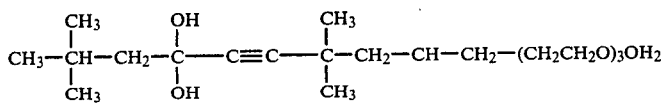

in place of the nonoxynol-10, failed after 1 cycle when used at levels of 0.5, 1.0, 1.5, and 2.0 parts.

COMPARATIVE EXAMPLE 4

When used in place of the nonoxynol-10, at levels between 2 and 5 parts, none of the following were successful in producing improvements in the freeze/thaw resistance of a formulation similar to that of Example 1: manitol, glycerin, sucrose, ethanol, methanol, or acetone.

That which is claimed is:

1. A method of improving the freeze/thaw stability of an anionically stabilized silicone emulsion useful as a sealant comprising mixing
    (A) 100 parts by weight of an anionically stabilized, hydroxyl endblocked polydiorganosiloxane having a weight average molecular weight of above 50,000, the organic radicals being monovalent hydrocarbon radicals containing less than 7 carbon atoms per radical and 2-(perfluoroalkyl)ethyl radicals having less than 7 carbon atoms per radical, present as an emulsion of dispersed particles in water, the emulsion having a pH of greater than 9 and a solids content of greater than 50 percent by weight,
    (B) from 0.075 to 0.75 part by weight of dialkyltindicarboxylate,
    (C) from 0.2 to 5 parts by weight of silane of the formula $RSi(OR')_3$ where R is a monovalent hydrocarbon radical of from 1 to 4 carbon atoms inclusive and R' is a lower alkyl radical of from 1 to 4 carbon atoms inclusive or a radical of the formula $-N=CR_2$ where R is defined as above,
    (D) from 50 to 200 parts by weight of inert, non-siliceous filler,
    (E) greater than 1 part by weight of

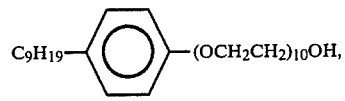

and
    (F) from 0.5 to 6.0 parts by weight of ethylene glycol, to give a composition having improved freeze/thaw stability.

2. The method of claim 1 in which the emulsion of (A) has a solids content of greater than 70 percent by weight, the silane (C) is methyltrimethoxysilane, and the filler (D) is present in an amount of from 90 to 125 parts by weight.

3. The method of claim 1 in which the nonoxynol-10 is present in an amount of from 1 to 3 parts by weight.

4. The method of claim 1 in which the ethylene glycol is present in an amount of from 1 to 3 parts by weight.

5. The method of claim 2 in which the nonoxynol-10 (E) is present in an amount of from 1 to 3 parts by weight and the ethylene glycol (F) is present in an amount of from 1 to 3 parts by weight.

6. The improved freeze/thaw stable composition produced by the process of claim 1.

7. The improved freeze/thaw stable composition produced by the process of claim 2.

8. The improved freeze/thaw stable composition produced by the process of claim 5.

* * * * *